United States Patent
Bajusz et al.

(10) Patent No.: US 8,601,791 B2
(45) Date of Patent: Dec. 10, 2013

(54) INTEGRATION OF A SURFACE HEAT EXCHANGER TO THE WALL OF AN AERODYNAMIC FLOWPATH BY A STRUCTURE OF REINFORCEMENT RODS

(75) Inventors: Denis Bajusz, Remicourt (BE); David Depaepe, Liège (BE); Alain Derclaye, Couthuin (BE); Régis Dupuy, Toulouse (FR)

(73) Assignee: Techspace Aero S.A., Herstal (Milmort) (BE)

( * ) Notice: Subject to any disclaimer, the term of this patent is extended or adjusted under 35 U.S.C. 154(b) by 356 days.

(21) Appl. No.: 12/977,226

(22) Filed: Dec. 23, 2010

(65) Prior Publication Data

US 2011/0146229 A1    Jun. 23, 2011

(30) Foreign Application Priority Data

Dec. 23, 2009    (EP) .................................... 09180605

(51) Int. Cl.
*F02K 99/00*    (2009.01)
(52) U.S. Cl.
USPC .................. 60/267; 60/266; 60/730; 60/796; 60/226.1; 60/39.08; 60/604; 60/39.091
(58) Field of Classification Search
USPC ............. 60/226.1, 226, 267, 730, 796, 39.08, 60/604, 39.091
See application file for complete search history.

(56) References Cited

U.S. PATENT DOCUMENTS

| | | | |
|---|---|---|---|
| 6,422,020 B1 * | 7/2002 | Rice | 60/730 |
| 8,181,443 B2 * | 5/2012 | Rago | 60/226.1 |
| 2008/0095611 A1 * | 4/2008 | Storage et al. | 415/116 |
| 2009/0165995 A1 * | 7/2009 | Bajusz et al. | 165/51 |
| 2010/0236213 A1 * | 9/2010 | Schilling | 60/39.08 |

FOREIGN PATENT DOCUMENTS

| | | |
|---|---|---|
| EP | 0924409 A2 | 6/1999 |
| EP | 1916399 A2 | 4/2008 |
| EP | 2011988 A2 | 1/2009 |
| EP | 2075194 A1 | 7/2009 |
| FR | 2902830 A1 | 12/2007 |

OTHER PUBLICATIONS

Search Report dated Jun. 1, 2010 for EP 09180605.

* cited by examiner

*Primary Examiner* — Phutthiwat Wongwian
*Assistant Examiner* — Craig Kim
(74) *Attorney, Agent, or Firm* — James E. Walton; Richard G. Eldredge

(57) ABSTRACT

Setting in place of one or several coolers in the wall of a secondary flow of a bypass turbomachine. The wall extends from an intermediate casing toward a leading edge of a separator nose between a primary flow and the secondary flow. The wall includes a series of support arms attached to an intermediate casing, distributed over the perimeter of the wall and directed upstream. A series of surface air-oil heat exchangers forming wall segments are arranged end-to-end on the support arms, so as to form an annular wall. A shroud having a leading edge is arranged and fixed in the area of the upstream edges of the heat exchangers, so as to complete the wall. The support arms include hydraulic connectors connected to one another on each arm, adapted to cooperate with corresponding connectors in the area of the heat exchangers and in the area of the intermediate casing.

18 Claims, 5 Drawing Sheets

INTEGRATION OF A SURFACE HEAT EXCHANGER TO THE WALL OF AN AERODYNAMIC FLOWPATH BY A STRUCTURE OF REINFORCEMENT RODS

This application claims priority under 35 U.S.C. §119 to European Patent Application No. 09180605.9, filed 23 Dec. 2009, which is incorporated herein by reference for all purposes.

BACKGROUND

1. Field of the Application

The present application relates to the problem of cooling the lubrication circuit of a bypass turbomachine, more particularly to setting in place a cooler in the secondary flowpath of a bypass turbomachine for an optimized cooling of the lubrication circuit.

2. Description of Related Art

Various mechanical or electrical elements of a turbomachine must be lubricated and/or cooled, such as, for example, certain bearings, certain reducers, and the electrical equipment. To do so, a lubrication circuit is provided. The oil plays the role of a lubricant and also of a heat transfer fluid, which necessitates providing for the heat thus collected to be evacuated. Current turbojet engines generate more and more heat, particularly for the following reasons:

- greater and greater weight of the bearing chambers;
- integration of high-power reducers, particularly in jet prop engines, the engines referred to as "open rotor" equipped with a non-faired dual fan or, in conventional turbojet engines where the fan is made to rotate at a lesser speed than the low-pressure compressor for the purpose of improving the performance; and
- integration of new equipment such as, for example, high-power starters/generators.

For these reasons, the fuel-oil exchangers (FCOC for Fuel cooled Oil cooler) are saturated and require the addition of cooling capacity via air-oil exchangers (ACOC for Air cooled Oil cooler). Various solutions are available to ensure the evacuation of the heat from such exchangers as, for example, the use of one or several scoops on the fairing which causes an increase of the drag, or the tapping of the engine airflow, which causes an aerodynamic disturbance of the flow of the engine, and, consequently, a decrease of performance.

In order to minimize the aerodynamic disturbances, heat exchangers, referred to as surface ones, are developed. They replace a wall in contact with an air circulation in order to present a thermal exchange surface between the heat transfer fluid such as, for example, the oil of the lubrication circuit and the air (cooling source).

The patent document EP 2075194 A1 discloses a bypass turbojet engine with an air-oil exchanger arranged on the inner shroud of the secondary flowpath in the area of the separator nose, from the leading edge up to the vicinity of outlet guide vanes. A series of fins, parallel to one another and perpendicular to the nose surface, extend over the surface of the end of the separator nose. According to a first embodiment, the oil flow channels are in the thickness of the wall forming the nose, which imposes rather substantial construction constraints. According to another embodiment, the channels are constituted by the space delimited between two plates of a stack of three plates comprising two plates, parallel and slightly spaced apart, between which a third, undulated plate, is housed by being connected in a fluid-tight manner by each line forming the top of all the undulations. This sandwich-type structure, despite being light and strong, has the drawback of having a limited thermal exchange capacity. More generally, making this surface exchanger according to this teaching imposes particular constraints when making the wall of the separator nose. The manufacturing cost of the walls is high and setting them in place is restrictive. Furthermore, the thermal exchange capacity is limited due to the exchange surface, which is limited up to a certain distance downstream from the leading edge. The extension of the exchange surface at a greater distance from the leading edge could cause mechanical stability problems due to the excess weight engendered by the exchanger.

Surface exchangers, although they optimize the aerodynamic impact, are generally more complex to manufacture and to integrate than the exchangers referred to as compact. Indeed, they must conform geometrically to the surface which they replace and they represent additional loads (weights, thermal expansion . . . ) for the zone which they integrate.

The patent document EP 1916399 A2 discloses a bypass turbojet engine with an annular surface exchanger integrated in the outer wall of the secondary flowpath. The integration of the exchanger in the outer wall is a priori easier than in the inner wall. However, the major drawback of this arrangement is that the heat exchanger is subject to deterioration by outside objects which penetrate the turbojet engine. Indeed, the rotation movement of the fan breaks these outside objects into small pieces; the small pieces are then pushed by centrifugal force downstream of the fan toward the outside of the secondary flowpath.

Although great strides have been made in the area of axial compressors, many shortcomings remain.

DETAILED DESCRIPTION OF THE PREFERRED EMBODIMENT

The present application discloses an integration of surface exchanger in a wall of the secondary flowpath enabling a substantial thermal exchange, while disturbing the secondary flow as little as possible, and which can be easily mounted.

The present application includes an inner annular wall or wall portion of the secondary flowpath of a bypass turbojet engine comprising a nose for separating primary and secondary flows and an intermediate casing, said wall or wall portion being situated between the leading edge of said separator nose and said intermediate casing; remarkable in that it comprises at least one surface air-oil heat exchanger forming an annular segment of said wall or wall portion; and at least one support arm of said wall or wall portion adapted to be fixed to the intermediate casing and extending from the intermediate casing toward said leading edge. These measures provide, among other things, the following advantages:

- a great cooling capacity since exploiting a rather large surface with very little disturbance on the aerodynamics of the secondary flowpath;
- support of a surface exchanger by means of a structure, optimized in terms of mass;
- optimum integration in the separator nose comprising an otherwise empty space and therefore available for heat exchangers;
- stable and rigid mounting due to the binding to the intermediate casing; and
- easy mounting since it is modular and from the outside.

According to an advantageous embodiment of the present application, the wall or wall portion comprises a plurality of heat exchangers forming a series of annular segments of said wall or wall portion.

According to an advantageous embodiment of the present application, heat exchangers are configured so as to be arranged end-to-end so as to form, preferably integrally, the annular surface, the wall preferably comprising a plurality of support arms adapted to be arranged in the vicinity of each junction of two heat exchangers.

According to yet another advantageous embodiment of the present application, the wall or wall portion comprises at least one annular segment of said wall or wall portion without heat exchanger and adapted to be arranged adjacent to the one or at least to one of the heat exchangers. As a function of the cooling needs, it can be advantageous to provide for a mixed wall, that is, made of segments of simple wall and also of heat exchangers.

According to yet another advantageous embodiment of the present application, the surface heat exchanger or exchangers extend from the intermediate casing toward said leading edge. This measure makes it possible to best use a large portion of the available surface on the separator nose. Furthermore, it is interesting that the heat exchanger or exchangers are in the vicinity of the intermediate casing so that their mass is as close as possible to said casing, for reasons of mechanical rigidity.

Preferably, the upstream edge of the heat exchanger or exchangers is at a distance from the leading edge of the separator nose.

According to yet another advantageous embodiment of the present application, the wall or wall portion comprises, in addition, a shroud, preferably in one piece, forming the leading edge of the separator nose and adapted to be fixed to the heat exchanger or exchangers. This shroud completes the assembly and increases the rigidity.

According to yet another advantageous embodiment of the present application, the wall or wall portion comprises means for attaching the shroud forming the leading edge with the heat exchanger or exchangers and with the support arm or arms, these means preferably involving a screwing. The shroud preferably comprises an annular surface adapted to come in contact with a corresponding surface of the heat exchangers so as to provide a rigid connection.

According to yet another advantageous embodiment of the present application, the wall or wall portion comprises a plurality of support arms adapted to be arranged along the inner surface of the annular surface of said wall.

According to yet another advantageous embodiment of the present application, the support arm or arms each comprise an attachment flange to the intermediate casing, an elongated portion extending from said flange and adapted to support the heat exchanger or exchangers, and reinforcement means for connecting the flange to the elongated portion.

According to yet another advantageous embodiment of the present application, the reinforcement means comprise a perforated rib having, preferably, a trellis-type of structure. This construction of the rib makes it possible to optimize the rigidity/weight ratio.

According to yet another advantageous embodiment of the present application, the support arm or arms comprises a first hydraulic connector adapted to ensure a hydraulic connection with the heat exchanger or exchangers, a second hydraulic connector adapted to ensure a hydraulic connection with the intermediate casing, a duct connecting the first and second connectors. Preferably, said duct is integrated in the support arm.

According to yet another advantageous embodiment of the present application, the second hydraulic connector is configured and arranged on the support arm so as to be able to cooperate by engagement with a corresponding connector of the intermediate casing, directly during the setting in place and attaching of the support arm to the intermediate casing.

According to yet another advantageous embodiment of the present application, the first hydraulic connector is configured and arranged on the support arm so as to be able to cooperate by engagement with a corresponding connector of the adjacent heat exchanger, directly by an approach motion of the exchanger toward the support arm followed by a translational movement in a direction corresponding to the upstream direction of the fluid flow of the operating turbojet engine.

The present application also relates to a turbojet engine comprising a wall such as defined hereinabove.

The present application also relates to a method for assembling a wall such as defined hereinabove on a turbojet engine, more particularly of a wall or wall portion comprising, in addition, a shroud, preferably made in one piece, forming the leading edge of the separator nose and adapted to be fixed to the heat exchanger or exchangers, the method comprising the following steps:

1. setting in place the support arm or arms and attachment to the intermediate casing;
2. setting in place the heat exchanger or exchangers on the support arm or arms so as to form the annular surface of said wall; and
3. setting in place the shroud on the annular surface.

This method makes the assembling particularly easy, in particular when the hydraulic ducts are provided in the support arm or arms.

Figure 1:
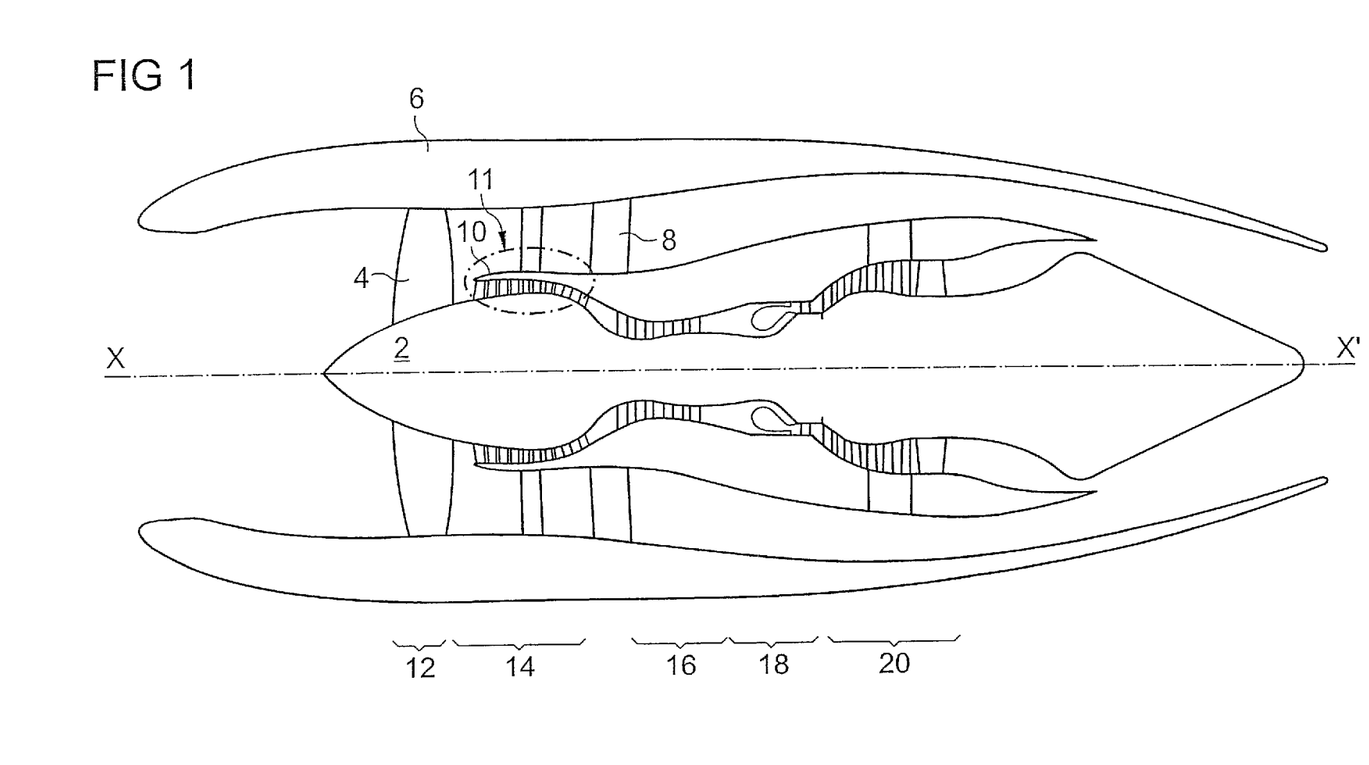
FIG. 1 is a general, cross-sectional view of a turbojet engine with the location of the wall equipped with air-oil exchangers situated according to the present application.

A bypass turbojet engine is schematically shown in cross-section in FIG. 1. The main elements, namely, the nacelle 6 serving as outer envelope for the various members, the rotor 2 rotating about the axis X-X' of the machine, and the fan 4 supported by the rotor 2.

The terms "downstream" and "upstream" relate to axial positions along the axis X-X' in the direction of the air flow passing through the turbojet engine.

The terms "inner" or "lower" and "outer" or "upper" relate to radial positions with respect to the axis X-X' of the turbomachine, "outer" or "upper" signifying a position that is farther away from the axis in question and "inner" or "lower" signifying a position that is closer to the axis.

Downstream of the fan 4, the air flow is separated by the separator nose 10 into a primary air flow and a secondary air flow. The primary air flow goes through an inner annular air passage, or primary flowpath, by penetrating in the low pressure compressor. The secondary air flow is diverted by the separator nose 10 in an outer annular air passage, or secondary flowpath. The turbojet engine comprises a series of functional groups: the fan 12, the low-pressure compressor 14, the high pressure compressor 16, the combustion chamber 18 and the turbine 20. Support arms 8 ensure a mechanical connection between the nacelle and the central portion comprising the rotor and the different stages. The separator nose comprises a wall delimiting the inner or internal portion of the secondary flowpath. The portion of this wall identified by the reference 11 extends from the leading edge of the separator nose up to the support arms shown in more detail in FIG. 2.

Stator blades (not visible) are provided in the area of the support arms 8 and distributed on the perimeter of the wall between these support arms. This way, the inner wall referenced 11 delimiting the secondary flowpath is free of stator blades.

Figure 2:
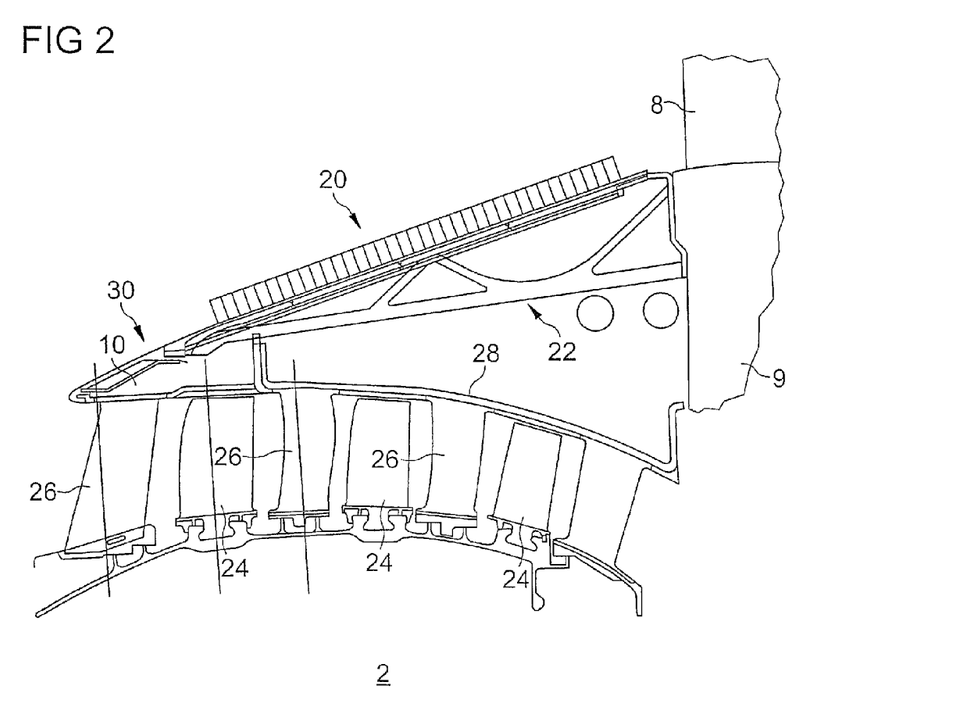
FIG. 2 is a cross-sectional view of the portion referred to as 11 of the turbojet engine of FIG. 1 comprising the wall equipped with air-oil exchangers according to the present application.

FIG. 2 is a cross-sectional view of the separator nose extending from the leading edge of the separator nose up to the support arms. It also shows the corresponding portion of the low-pressure compressor. The separator nose 10 ensures the separation of the air flow generated by the fan between the primary flowpath traversing the low-pressure compressor and the secondary flowpath. The primary flowpath is delimited by the envelope of the rotor 2 and the casing 28. The moveable or rotor blades 26 are supported by the rotor 2 and the stationary or stator vanes are supported by the separator nose 10 and the casing 28. The wall portion of the separator nose is essentially constituted of an air-oil surface heat exchanger 20, a support arm 22, and a shroud 30 forming the leading edge. The support arm 22 is fixed to the intermediate casing 9 which is itself rigidly fixed to the nacelle by the support arms 8. The intermediate casing thus constitutes a particularly robust and rigid portion of the machine. The support arm extends from the intermediate casing 9 toward the shroud 30 forming the leading edge of the separator nose. It is a generally triangular structure supporting the heat exchanger 20. The latter comprises a plate forming the wall and provided with one or several oil cooling channels. The plate is provided with cooling fins on its exterior surface. The heat exchanger is generally curved so as to constitute an annular segment of the wall. Alternatively, it can comprise a series of generally plane, sometimes slightly curved, small surfaces forming an angle with one another so as to form a generally curved shape.

Figure 3:
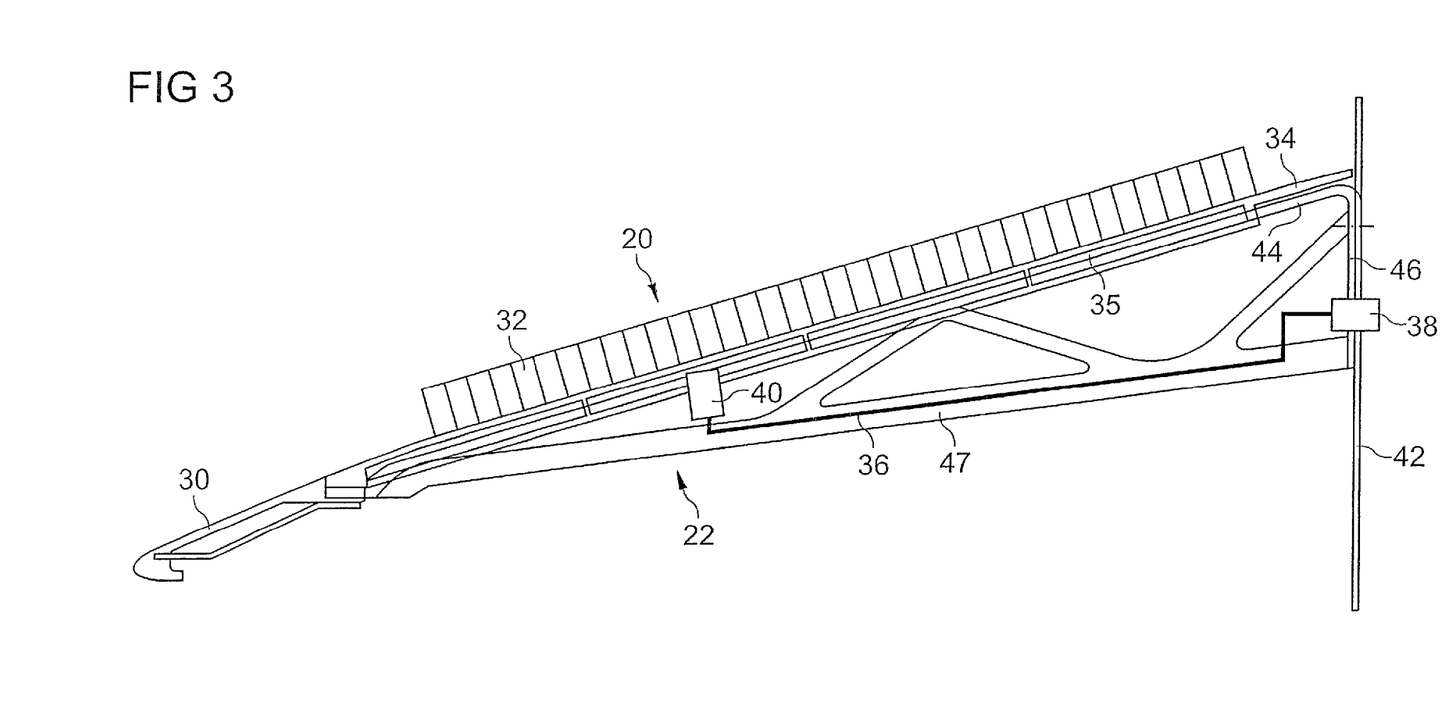
FIG. 3 is a cross-sectional view of the wall according to the present application.

The heat exchanger 20, the support arm 22, and the shroud 30 forming the leading edge of FIG. 2 are shown in more detail in FIG. 3. The support arm 22 is made of a metallic material, preferably titanium. It comprises an attachment flange 46, an elongated and generally plane portion 44 and a rib 47 ensuring a rigid connection between the flange 46 and the elongated portion 44. This rib 47 is ideally perforated, preferably like a trellis, in order to optimize its rigidity in its general plane with respect to the material weight. The attachment flange 46 is adapted to ensure a threaded connection with the intermediate casing. It is shown in FIG. 3 with a plane shape to show the invention more clearly. In reality, it can take various, more complex shapes, as a function of the shape of the intermediate casing. In any event, it will require a support surface on the intermediate casing so as to be able to support the heat exchangers, particularly in a plane that is generally perpendicular to the surface of the heat exchanger and passing through the axis of the turbojet engine. The elongated portion 44 is adapted to receive the rear surface of the heat exchanger 20.

The heat exchanger 20 comprises a plate 34, generally curved so as to form an annular segment of the wall, the plate 34 being provided with fins 32 on its exterior surface. These fins are slim strips, parallel with one another, and oriented according to an angle with respect to the axis X-X'. This angle is typically comprised between 20° and 60°, preferably between 30° and 50°, so the fins can be generally parallel to the air flow direction at this location. Alternatively, the fins could be parallel to the axis X-X'. The plate 34 comprises, under the fins, one or several channels through which passes the oil to be cooled. These channels are shown very schematically as openings 35 in the thickness of the plate 34 under the fins. Different arrangements of the channel or channels are possible and will depend upon various dimensioning parameters of the wall and upon the exchange power of the heat exchanger.

The shroud 30 of the leading edge is fixed to the upstream edge of the plate 34 of the heat exchanger 20 in order to complete the inner wall of the secondary flowpath.

It must be noted that the heat exchanger can be made several different ways. Preferably, it is constituted of a first upper plate comprising the cooling fins and a second lower plate fixed to the first by welding or gluing. The oil circulation channels can thus be easily made on the lower surface of the upper plate and/or on the upper surface of the lower plate. It is preferably made of aluminum.

A main supply line 42 is provided in the area of the intermediate casing. This line is part of the lubrication circuit of the turbojet engine and extends up to the nacelle via one or several support arms of the turbojet engine. A connector 38 is provided in the area of the intermediate casing in order to cooperate with a duct 36 loaded on the support arm 22. A connector 40 is provided on the support arm, in the vicinity of the elongated portion adapted to receive the heat exchanger in order to cooperate with a corresponding connector of the exchanger.

Figure 4:
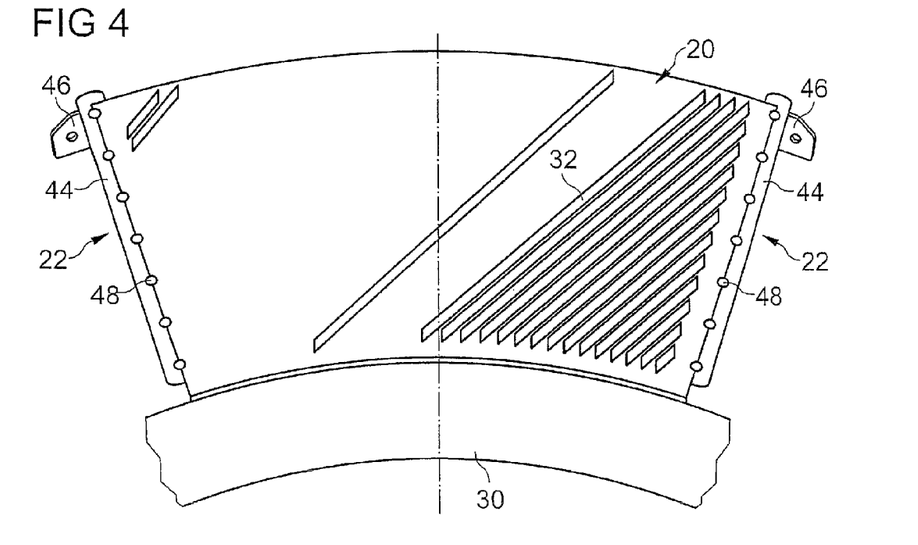
FIG. 4 is a perspective view from the front of the turbojet engine of a wall portion according to the present application formed by a surface heat exchanger supported by two support arms and equipped with a shroud forming the leading edge.
Figure 5:
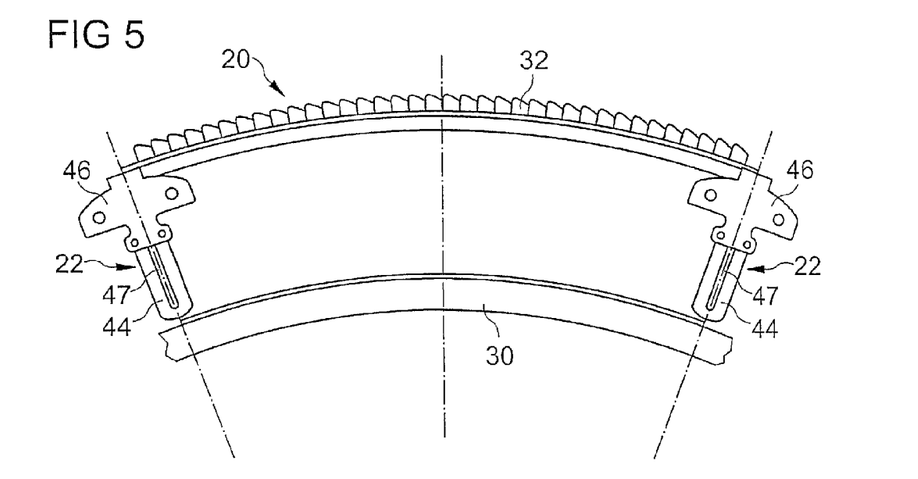
FIG. 5 is a perspective view from the back of the turbojet engine of the wall portion of FIG. 4.

FIGS. 4 and 5 are perspective views of an inner wall portion of a secondary flowpath showing well the annular development of the wall. FIG. 4 is a perspective view of the wall from an exterior and upstream (or front) position. FIG. 5 is a perspective view of the wall from an exterior and downstream (or rear) position. These two views show a wall portion formed by a heat exchanger 20 supported by two support arms 22, one at each lateral edge, and completed by a leading edge shroud. Each of the lateral edges of the heat exchanger is supported on a major portion of its length (preferably at least 80%) by a support arm 22. The plate of the heat exchanger has a reduced thickness at the lateral edges as well as a series of semi-holes 48 adapted to cooperate with corresponding semi-holes of an adjacent heat exchanger and with the holes 48 of the support arm via threaded fastening means (not shown). The inclination angle of the cooling fins 32 with respect to the axis of the machine and previously mentioned are shown well in FIG. 4. The attachment flanges 46 of the support arms 22 are also shown in FIGS. 4 and 5. The annular wall is thus formed by a succession of heat exchangers arranged successively on support arms arranged along the wall surface. Preferably, the adjacent edges of the plates of the heat exchangers are contiguous. However, a clearance is preferably provided in order to compensate for thermal expansion. Alternatively, an intermediate plate can be provided between two adjacent edges. It is also possible to provide the heat exchangers with one of the two lateral edges designed to receive the opposite edge of the adjacent exchanger, such as, for example, a shoulder. In this case, setting the different heat exchangers in place must be carried out in a determined direction. The drawings in FIGS. 4 and 5 are given only by way of example and other embodiments are possible.

It must also be noted that, as a function of the needs of cooling capacity, it can be unnecessary to provide for heat exchangers over the entire perimeter of the inner wall of the secondary flowpath. Indeed, it is possible to provide only for certain of the wall segments to be in the form of a heat exchanger. In this case, the wall segments which are not in the form of a heat exchanger are much more simply built. The interest of the invention is shown here as it enables a certain freedom of sizing while offering a high maximum heat exchange capacity. Having the support arms is essentially required because of the excess weight caused by the heat exchanger or exchangers. If the wall has only certain sections provided with heat exchangers, the number of support arms can eventually be reduced on the simple wall areas, by opposition with the heat exchange areas.

FIG. 5 shows the support role of the arms 22. One can see the elongated portion 44, generally plane and narrow and the rib 47 connecting this portion to the flange 46, with a generally triangular shape.

As previously mentioned, the wall portion extending from the leading edge of the nose up to the upstream edge of the plate of the heat exchanger is preferably formed by a unitary shroud, that is, made in one piece. This shroud 30 is thus set in place after the wall portion formed by the adjacent plates has been completely formed by assembling the plates and the support arms. The shroud 30 is then fixed to the wall and completes the assembly by rigidifying it, particularly with respect to the flexions in planes comprising the axis X-X' or parallel planes. The shroud 30 is preferably made of metallic material, particularly aluminum, in order to limit or even cancel the icing problems in the vicinity of the leading edge.

The drawings of FIGS. 4 and 5 do not show the hydraulic connections for reasons of clarity of the illustration.

Figure 6:
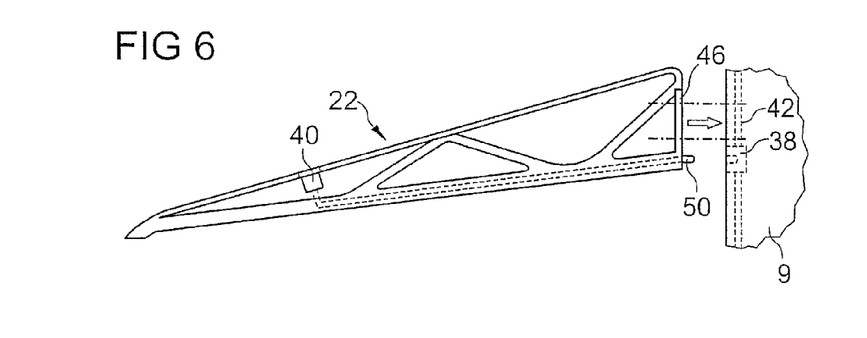
FIG. 6 is a cross-sectional view of the first assembly step of the wall.
Figure 7:
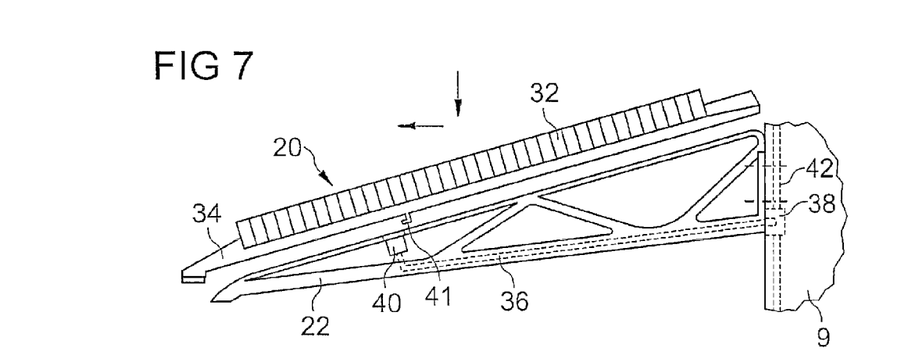
FIG. 7 is a cross-sectional view of the second assembly step of the wall.
Figure 8:
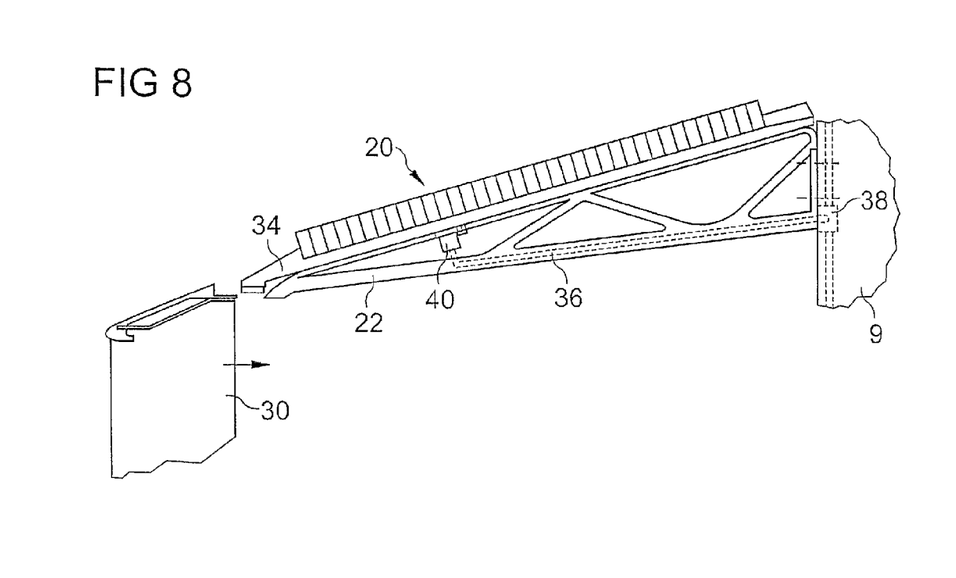
FIG. 8 is a cross-sectional view of the third assembly step of the wall.

The different main steps for assembling or mounting the wall are shown in FIGS. 6, 7, and 8.

FIG. 6 shows the mounting of a support arm 22 to the intermediate casing. The support arm 22 comprises at least one hydraulic line connecting a first connector 40 arranged in the vicinity of the contact surface of the elongated portion of the arm, with a second connector 50 arranged in the area of the flange 46. The first hydraulic connector 40 is adapted to cooperate with a corresponding connector by a translational movement generally parallel to the plane of the contact surface of the elongated portion of the arm and adapted to receive the heat exchanger. The second connector is designed and arranged on or in the vicinity of the flange so as to be able to cooperate with a corresponding connector 38 on the intermediate casing 9 directly by a translational movement according to a direction, generally perpendicular to the flange or to the general plane of the flange. The connector 38 of the intermediate casing is connected to a main line 42 of the intermediate casing 9. This way, the mounting of the support arm 22 makes it possible, in a very simple manner, to ensure at the same time a hydraulic connection between the connector 40 of the arm and the main line 42. The flange 46 is preferably attached onto the intermediate casing with screws. Any other attachment method known by one having ordinary skill in the art can be envisioned, alternatively or as a complement.

FIG. 7 shows the setting in place of the heat exchanger. The latter is subjected to an approach motion so as to be generally parallel with the surfaces for receiving the support arms. The drawing shows only one support arm; mounting a heat exchanger or a plate forming a simple wall is preferably done on two support arms arranged at a distance from one another so as to support the wall element in the area of its two lateral edges. The heat exchanger is then brought down on the two support arms in a position, slightly offset downstream with respect to the final position, so that its hydraulic connector 41 is arranged in front of the hydraulic connector 40 of the corresponding support arm. The heat exchanger is then displaced frontward (that is, in an upstream direction) so as to make the hydraulic connectors 41 and 40 cooperate. The heat exchanger can then be attached to at least one of the two support arms with screws. Preferably, the free side is not fixed to the arm in order to be able to set the exchanger or following wall element in place.

Once the annular wall, constituted of heat exchangers and possibly of segments of simple wall, has been assembled, the shroud forming the leading edge is set in place by a simple, translational approach motion according to the axis of the machine in the downstream direction so as to take the form of the front or upstream edges of the heat exchangers and possibly of the segments of simple wall. The shroud is affixed to the heat exchangers and, possibly, to the wall segments, preferably with screws. As a function of the sizing of the different elements constituting this wall, this connection can also be done with the end of the support arms.

It is apparent that an invention with significant advantages has been described and illustrated. The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. Although the present application is shown in a limited number of forms, it is not limited to just these forms, but is amenable to various changes and modifications without departing from the spirit thereof.

We claim:

1. An annular inner wall for a bypass turbojet engine with
   a nose for separating a primary flow and a secondary flow and
   an intermediate casing for supporting a rotor; said inner wall being intended to be
   disposed between a leading edge of the nose and the intermediate casing and comprising:
   at least one surface air-oil heat exchanger forming an annular segment of the wall; and
   at least one support arm fixed to the intermediate casing and extending from the intermediate casing toward the leading edge; said support arm comprising:
     an attachment flange for attaching each support arm to the intermediate casing; and
     an elongated portion extending from the attachment flange and being configured to support the heat exchanger.

2. The wall according to claim 1, further comprising:
   a plurality of heat exchangers forming a series of annular segments of the wall portion.

3. The wall according to claim 2, further comprising:
   a support arm disposed in the vicinity of each junction of two heat exchangers.

4. The wall according to claim 2, wherein the heat exchangers are configured end-to-end, so as to form the annular segment.

5. The wall according to claim 2, wherein the heat exchangers are configured so as to form at least one annular segment of the wall portion without a heat exchanger.

6. The wall according to claim 1, wherein the heat exchanger extends from the intermediate casing toward the leading edge.

7. The wall according to claim 1, further comprising:
a shroud forming the leading edge of the nose, the shroud being adapted to be fixed to the heat exchanger.

8. The wall according to claim 7, wherein the shroud is a one-piece shroud.

9. The wall according to claim 7, further comprising:
a means for attaching the shroud to the heat exchanger and the support arm.

10. The wall according to claim 9, wherein the means for attaching is a screwing means.

11. The wall according to claim 3, wherein the support arms are configured to be arranged along the inner side of the annular surface of the wall portion.

12. The wall according to claim 1, wherein the support arm comprises:
a reinforcement means for connecting the flange to the elongated portion.

13. The wall according to claim 12, wherein the reinforcement means comprises:
a perforated rib having a trellis-type of structure.

14. The wall according to claim 1, further comprising:
a first hydraulic connector configured to ensure a hydraulic connection with the heat exchanger; and
a second hydraulic connector adapted to ensure a hydraulic connection with the intermediate casing; and
a duct connecting the first hydraulic connector and second hydraulic connector.

15. The wall according to claim 14, wherein the second hydraulic connector is configured on the support arm, so as to directly engage a corresponding connector of the intermediate casing during attachment of the support arm to the intermediate casing.

16. The wall according to claim 14, wherein the first hydraulic connector is configured on the support arm, so as to directly engage a corresponding connector of the adjacent heat exchanger by an approach motion of the heat exchanger toward the support arm followed by a translational movement in a direction corresponding to the upstream direction of the fluid flow of the turbojet engine.

17. A turbojet engine, comprising:
an intermediate casing
a nose for separating a primary flow and a secondary flow of the engine;
an internal wall portion of the secondary flow path of the engine, coupled to the intermediate casing, the internal wall portion comprising:
at least one surface air-oil heat exchanger forming an annular segment of said wall; and
at least one support arm carrying the heat exchanger, said support arm being fixed to the intermediate casing and extending from the intermediate casing toward the leading edge; said support arm comprising:
an attachment flange for attaching each support arm to the intermediate casing; and
an elongated portion extending from the attachment flange and being configured to support the heat exchanger.

18. A method of cooling oil of a lubrication and cooling circuit of a bypass axial turbomachine having a nacelle, a rotor, and an axial compressor, comprising:
coupling a support member to the nacelle;
coupling an intermediate casing to the support member;
coupling an internal casing to the intermediate casing;
providing an internal wall having a leading edge nose portion and a support arm for separating the flow into a primary flow and a secondary flow, said support arm comprising an attachment flange for attaching each support arm to the intermediate casing, and an elongated portion extending from the attachment flange and being configured to support the heat exchanger;
coupling the internal wall to the intermediate casing;
coupling at least one surface air-oil heat exchanger to the support arm, such that the heat exchanger is disposed in the secondary flow; and
circulating the oil of the lubrication and cooling circuit through the heat exchanger.

\* \* \* \* \*